United States Patent [19]

Reed

[11] Patent Number: 5,577,180
[45] Date of Patent: Nov. 19, 1996

[54] ZONE DATA STREAMING FOR 3-DIMENSIONAL VIDEO ENVIRONMENT

[75] Inventor: Lawrence P. Reed, Palo Alto, Calif.

[73] Assignee: The 3DO Company, Redwood City, Calif.

[21] Appl. No.: 369,526

[22] Filed: Jan. 5, 1995

[51] Int. Cl.$^6$ .................................................. G06T 1/00
[52] U.S. Cl. ........................................ 395/135; 395/806
[58] Field of Search ................................ 395/135, 133, 395/141, 153, 154, 162, 164; 358/133, 141, 142, 143

[56] References Cited

U.S. PATENT DOCUMENTS

5,122,873  6/1992  Golin ........................................ 358/133
5,363,482  11/1994  Victor et al. ............................ 395/157

*Primary Examiner*—Almis R. Jankus
*Attorney, Agent, or Firm*—Fliesler, Dubb, Meyer & Lovejoy

[57] ABSTRACT

A system for continuously presenting audio/video data. The data for the entire program is too large to be completely loaded into memory at one time; therefore, the data is divided into a set of overlapping zones. Each zone is divided into subzones. Two overlapping zones overlap because they both share a common (or overlapping) subzone. When a user moves from a first zone to a second zone, the user will first move into the overlapping subzone prior to moving to the second zone. While the user is in the overlapping subzone, data for the second zone is loaded into memory. Thus, when the user leaves the overlapping zone and enters the second zone, data for the second zone is presented in a continuous fashion.

22 Claims, 6 Drawing Sheets

ZONE DATA STREAMING FOR 3-DIMENSIONAL VIDEO ENVIRONMENT

CROSS-REFERENCE TO RELATED APPLICATIONS/PATENTS

This Application is related to the following Applications/Patents, all assigned to the assignee of the subject Application:

U.S. patent application Ser. No. 07/970,308, entitled AUDIO/VIDEO COMPUTER ARCHITECTURE, by inventors Mical et al., filed Nov. 2, 1992, Attorney Docket No. MDIO4222;

U.S. patent application Ser. No. 07/970,287, entitled RESOLUTION ENHANCEMENT FOR VIDEO DISPLAY USING MULTI-LINE INTERPOLATION, by inventors Mical et al., filed Nov. 2, 1992, now U.S. Pat. No. 5,481,275;

U.S. Pat. No. 5,337,363, issued Aug. 9, 1994, entitled METHOD FOR GENERATING THREE DIMENSIONAL SOUND, by inventor David C. Platt, now U.S. Pat. No. 5,337,363;

U.S. patent application Ser. No. 07/970,278, entitled METHOD FOR CONTROLLING A SPRYTE RENDERING PROCESSOR, by inventors Mical et al., filed Nov. 2, 1992, Attorney Docket No. MDIO3040;

U.S. patent application Ser. No. 07/970,289, entitled SPRYTE RENDERING SYSTEM WITH IMPROVED CORNER CALCULATING ENGINE AND IMPROVED POLYGON-PAINT ENGINE, by inventors Needle et al., filed Nov. 2, 1992, Attorney Docket No. MDIO4232;

U.S. patent application Ser. No. 08/300,867, entitled METHOD AND APPARATUS FOR UPDATING A CLUT DURING HORIZONTAL BLANKING, by inventors Mical et al., filed Sep. 2, 1994, Attorney Docket No. MDIO4250CON1;

U.S. patent application Ser. No. 07/970,083, entitled IMPROVED METHOD AND APPARATUS FOR PROCESSING IMAGE DATA, by inventors Mical et al., filed Nov. 2, 1992, Attorney Docket No. MDIO4230;

U.S. patent application Ser. No. 07/970,151, entitled PLAYER BUS APPARATUS AND METHOD, by inventors Needle et al., filed Nov. 2, 1992, Attorney Docket No. MDIO4270;

U.S. patent application Ser. No. 08/001,463, entitled DIGITAL SIGNAL PROCESSOR ARCHITECTURE, by inventors Gray, III et al., filed Jan. 6, 1993, Attorney Docket No. MDIO4210;

U.S. patent application Ser. No. 08/146,505, entitled DISPLAY LIST MANAGEMENT MECHANISM FOR REAL-TIME CONTROL OF BY-THE-LINE MODIFIABLE VIDEO DISPLAY SYSTEM, by inventors Mical et al., filed Nov. 1, 1993, Attorney Docket No. MDIO4255;

U.S. patent application Ser. No. 08/302,380, entitled EXPANSION BUS, by inventors Tompane et al., filed Sep. 8, 1994, Attorney Docket No. MDIO4280CON1;

U.S. patent application Ser. No. 08/267,978, entitled METHOD AND APPARATUS FOR AUDIO DATA COMPRESSION AND DECOMPRESSION, by inventors Burk et al., Attorney Docket No. MDIO4380, filed Jun. 29, 1994; and U.S. patent application Ser. No. 08/338,427, entitled DECOMPRESSOR AND COMPRESSOR FOR SIMULTANEOUSLY DECOMPRESSING AND COMPRESSING A PLURALITY OF PIXELS IN A PIXEL ARRAY IN A DIGITAL IMAGE DIFFERENTIAL PULSE CODE MODULATION (DPCM) SYSTEM, by inventor Gregory K. Wallace, Attorney Docket No. MDIO4390, filed Nov. 14, 1994.

Each of these related Applications/Patents is incorporated herein by reference.

BACKGROUND OF THE INVENTION

1. Field of the Invention

The present invention is directed to a system for presenting audio/video programs, and more particularly, to a system which is capable of presenting audio and video images without interruption during the loading of data from a storage device.

2. Description of the Related Art

Interactive multi-media systems are systems in which the flow of an audio/video presentation is adjusted in response to signals provided interactively by a user. An audio/video presentation (or program) includes the presentation of audio and/or video images. In the consumer market, interactive multi-media systems typically run game programs, entertainment programs or education programs (collectively audio/video programs), which are purchased by the user and loaded into the system. Consumer interactive multi-media systems are or have been available from such companies as Nintendo K.K., Sega Enterprises, Atari Corp., Commodore-Amiga, and The 3DO Company, among others.

One example of the game programs used in consumer interactive multi-media systems includes maze (or adventure) games. The maze game usually takes the form of the user playing the part of an Adventurer (e.g. a medieval knight, dragon slayer, or other action hero) journeying through an environment filled with enemies and objects. The programmer creates the environment. The environment is defined as the setting (or location) of the game. For example, the environment could be a medieval castle with dungeons and secret passageways. Alternatively, the environment could be a maze, town, enchanted forest or any other indoor or outdoor location. The enemies include animals, monsters, humans armed with weapons, robots or anything else designed to cause harm to the Adventurer. Objects typically include stationary objects which may or may not serve as an obstacle to the Adventurer.

These games often provide a task which an Adventurer must perform. The user receives points depending on how well the Adventurer (controlled by the user) performs that task. One example of such a maze game is where the user plays the part of an Action Hero (Adventurer) who must save various persons being held captive in a castle. The castle has many secret passageways and dungeons. Inside the castle are fighters and animals who attempt to kill the Action Hero. The Action Hero must fight off the animals and fighters, take valuables from the castle (receive points), and save those people being held captive.

Although the Action Hero is said to "move" through the environment, "fight off" animals and enemies, "take" valuables, and "save" people, of course the user does not actually perform real-life actions of moving, fighting, taking and saving. Rather, the system, under software control, simulates such activities in response to the user's manipulation of a user-input device. As used herein, references to actions performed by a user or character in the environment, are intended as a shorthand to refer to system-simulation of such actions so that the user appears to have performed the action. For example, the user may indicate a desire to move to the right, by pressing a right-arrow button on the joypad. What the user really intends, and what is intended herein by such a statement, is that an image of the Action Hero, on the display, be moved to the right relative to other images on the display. The system may accomplish this by drawing a new frame into a frame buffer in memory, with the image of the Action Hero represented in slightly different memory locations than in the previous frame, relative to other images represented in the frame buffer. The system would then display the new frame buffer on the display.

In the past, some manufacturers of consumer interactive multi-media systems have had to make significant compromises in the realism of sounds and video images created by the system, as well as game play choices, in order to maintain a low price for the consumer market. For example, memory is expensive. In order to keep the costs low, interactive multi-media systems are generally designed with memory smaller than the size needed to store an entire audio/video program. Typically, audio/video programs are stored on cartridges, cassettes, floppy disks, networks, compact discs (CD), a server on a cable television network, or other storage medium (collectively called storage devices). A compact disc is defined to include ROM and writable discs.

Because the entire audio/video program cannot always fit into memory, only a portion of the program is read from the storage device into memory at a time. Thus, audio/video programs are often broken up into a series of levels. For example, each floor of a multi-floor castle could be a level, or each room in a maze could be a level. The levels are chosen such that all of the software necessary to implement that level can fit in the memory of the interactive multi-media system at one time. Thus, when the presentation of the audio/video program begins, all the software necessary to implement level 1 of the program is loaded into memory. The user then interacts with level 1 of the game. Interacts is defined to include watching, listening, inputting information, playing along, etc. Most games allow the user to progress from level 1 to level 2 under defined circumstances. For example, some games allow the user to progress from level 1 to level 2 only when the user has achieved a certain success level at level 1. Other games allow the user to progress from level 1 to level 2 when the user has crossed a boundary.

Dividing a program into a series of levels generally results in fairly extensive data loading periods when the user progresses from one level to another level, as new data is retrieved to replace data that is no longer needed. Thus, when the user progresses from level 1 to level 2, there is generally idle time. This idle time generally takes the form of the screen freezing or repeating a sequence of video images and no action for a period of time. Thus, when the user finishes a level, the user then must endure idle time before the user can play the next level. Thus, the user's enjoyment of the audio/video presentation is impeded by idle time throughout the presentation.

SUMMARY OF THE INVENTION

The present invention is directed to overcome the disadvantages of the prior art. Thus, the present invention provides a mechanism whereby large amounts of data available on, for example, a CD can be accessed in a manner such as to provide effectively continuous action from start to finish of the audio/video presentation. Furthermore, the present invention allows for the user to wander about from one place to another in the environment, regardless of the complexity of the environment, without worrying about crossing between levels. Transitions from level to level are managed in such a manner as to minimize any perception of change, and to provide the illusion of continuity throughout the entire presentation.

The present invention is accomplished by dividing up the environment into overlapping zones. For example, each zone could represent a section of the maze. The data necessary to implement each zone is capable of being fit into the memory for the interactive multi-media system. Because the zones overlap, when a user is progressing from one zone to another zone, the user first enters the overlapping portion of the two zones. While in the overlapping portion (the transition or overlapping subzone), data for the second zone is loaded into memory. By the time the user reaches the end of the overlapping portion, the data for the second zone is already in the memory and ready for use. Thus, the user experiences no apparent discontinuity or idle times when journeying between zones. Because of the apparent continuous nature of the zones, the user is free to roam between zones. The phrases "apparent continuity" or "appears to be continuous" are meant to convey the idea that the user does not perceive idle time in the audio/video presentation.

One embodiment of the present invention includes a structure for storing data to be used in audio/video presentations. The data is created by programming or by recording audio or video images. The structure includes a set of instructions for using the data and a plurality of overlapping data zones. Each zone represents a subset of data. The data is loaded as described above to allow for continuous audio/video presentation to the user. The audio/video presentation can be a video game with an environment. The environment is divided into overlapping environment zones. Each of the environment zones corresponds to a data zone. This structure for storing data can be used in an interactive multi-media system which includes means for loading the data, means for processing and presenting the data and appropriate memory.

In one alternative, the system includes a means for providing a hysteresis effect. That is, the overlapping subzones have trigger lines on either end, with some wandering space inbetween. When a user crosses the trigger line closest to the new zone, data for the new zone is loaded into memory. This gives a hysteresis effect, so that the user cannot simply remain at one point and make the program thrash by stepping back and forth.

The system described above operates by storing memory resident data and reading stream data for a first zone while the viewer is interacting with the corresponding environment zone. When the user crosses the trigger line in the overlap subzone, the system loads and stores memory data from the second zone and reads the stream data for the second zone. When the user leaves the overlap zone and is in the second zone, data from the second zone is presented in continuous fashion. Thus, there is no idle time and the user is free to wander between zones.

These and other objects and advantages of the invention will appear more clearly from the following description in which the preferred embodiments of the invention have been set forth in detail in conjunction with the drawings.

DETAILED DESCRIPTION

I. Hardware Overview

A. System Architecture

Figure 1:
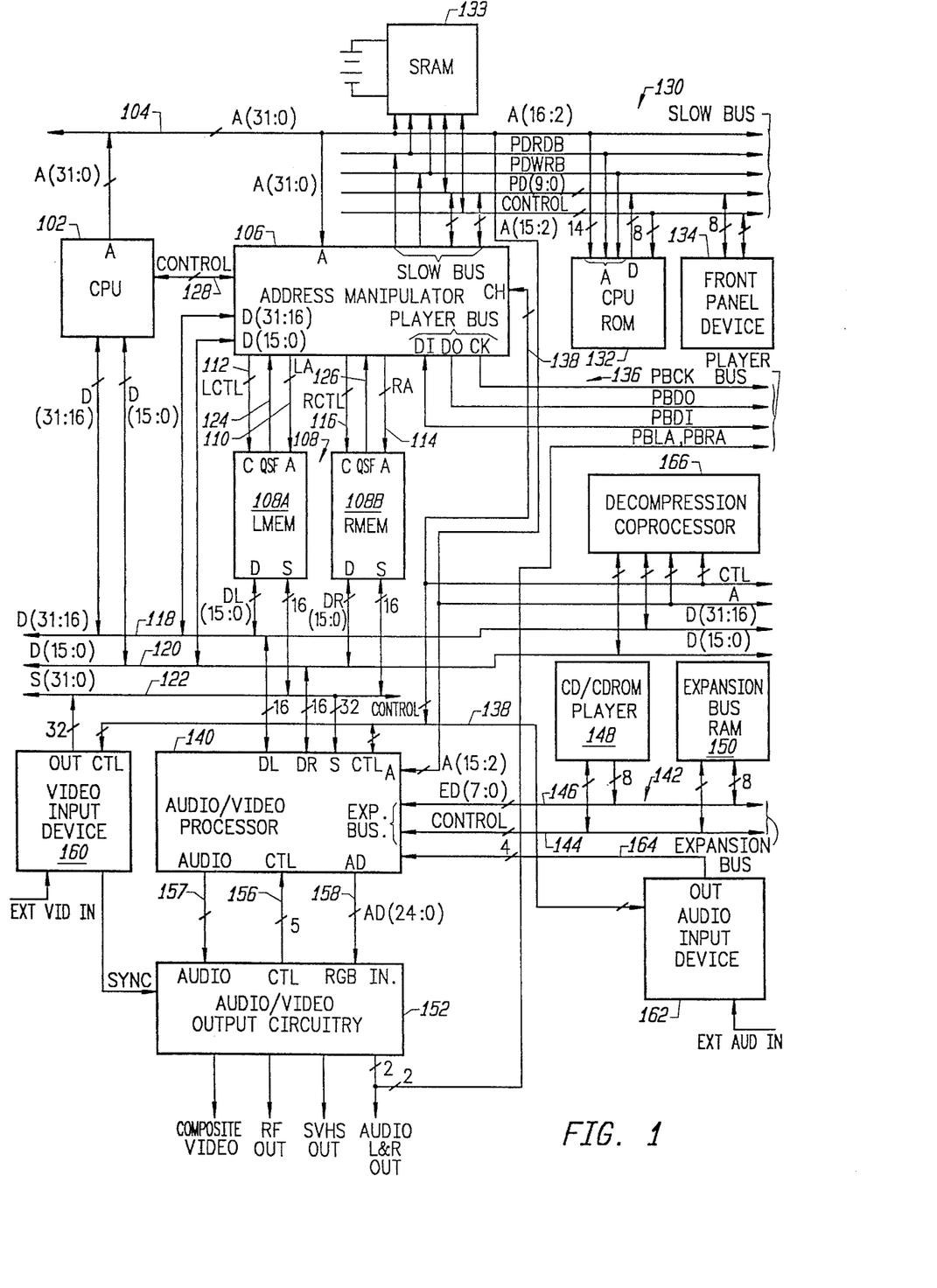
FIG. 1 is a block diagram of the major components of a interactive multi-media system which can be used to implement the features of the present invention.

FIG. 1 is a block diagram showing the major components of an example consumer interactive multi-media system which can be used to implement the features of the present invention. It comprises a CPU 102, which is a general purpose 32-bit microprocessor. The address pins of CPU 102 are coupled to a 32-bit address bus 104, which is provided as an input to an address manipulator 106.

The address manipulator 106 contains, among other things, an address generator for providing DMA-generated addresses to system memory, as well as addresses from other sources; a D-bus arbiter; two spryte engines; and interfaces to a player bus, a slow bus and a set of external processors. The address manipulator 106 generates addresses for system memory 108, which includes a left memory bank 108A and a right memory bank 108B. System memory is 32-bits wide, the high-order 16 bits of each 32-bit word being in left memory 108A and the low-order 16 bits being in right memory 108B. The CPU 102 addresses system memory in words or bytes, but the address manipulator 106 can address each half of the memory entirely independently. Address manipulator 106 provides addresses and control signals to left memory 108A over an LA bus 110 and an LCTL bus 112, respectively, and provides addresses and control signals to right memory 108B over an RA bus 114 and RCTL bus 116, respectively.

System memory 108 can include one or two "sets" of video RAM (VRAM) and zero, one or two sets of DRAM. A set of VRAM contains 512K bytes of left memory and 512K bytes of right memory, for a total of one megabyte. A set of DRAM is, depending on the system configuration, one, four or 16 megabytes long. Other options may also be made available. As with VRAM, half of each set is located in the left bank of memory and the other half is located in the right bank of memory.

Any standard DRAM and VRAM will suffice. For VRAM, an array made up of those described in NEC Electronics, Inc., "µPD 482234, 482235 Video RAM", Advance Copy Datasheet (2/92), or in NEC Corporation, "µPD 482445 256K-word×16-bit Dual Port Graphics Buffer", Preliminary Datasheet (January 1992), both of which are incorporated herein by reference, can be used. The former reference describes a two megabit VRAM and the latter describes a four megabit VRAM.

All of the left and right bank system memory sets receive the respective left and right half addresses generated by the address manipulator 106. All of the left bank sets also include a data port which are coupled bi-directionally with a left half data bus D(31:16) 118. Similarly, the data ports of all of the sets of right bank memory are coupled bi-directionally with a right half data bus D(15:0) 120. The VRAM sets also have a serial port S, which is coupled bi-directionally with an S(31:0) bus 122.

In VRAM devices, there is a static holding register that can be loaded with a page of data from the internal DRAM. The contents of this holding register can be clocked out a serial data port of the device. In the above-mentioned NEC VRAM, 512 8-bit bytes of data are loaded into the static holding register in response to an S-port read transfer command issued to the device. These bytes are shifted out the 8-bit-wide S-port of the device in response to a serial clock (SC), one byte per clock tick. The NEC device also permits the serial port to be used to write a page of data into a selected row of VRAM.

Referring again to FIG. 1, address manipulator 106 also provides and receives control signals to and from the CPU 102 over lines 128, and is also coupled bi-directionally with the left and right data buses 118 and 120. Address manipulator 106 also interfaces to a slow bus 130, which is an 8-bit bus for accessing such devices as a CPU ROM 132, a battery-backed SRAM 133, and/or various front panel devices 134. Address manipulator 106 may also support additional CPU-accessible RAM and an FM sound generator device. The slow bus 130 includes 14 bits of the address bus 104 A(16:2), an 8-bit data bus PD(7:0), a PDRDB read strobe, a PDWRB write strobe, and various control lines. PDRDB and PDWRB are used to carry the two low-order address lines for accessing the 8-bit wide CPU ROM 132.

Address manipulator 106 also interfaces to a player bus 136, which is used to connect the system to various consumer input/output devices such as joypads, joysticks, 3-D glasses, hand controllers and steering wheels, and also to auxiliary devices such IR pods for wireless operation and game saver cartridges. The player bus 136 is a serial bus. The player bus is described in the above-mentioned PLAYER BUS APPARATUS AND METHOD application. Briefly, it includes a clock line PBCK which is driven by the address manipulator 106, a data output line PDBO which is also driven by address manipulator 106, and a data input line PBDI which is driven by an external device. I/O controllers on the player bus 136 are daisy chained with the two serial data lines feeding through each of the controllers. The protocol automatically identifies each controller device type, with multiple identical controllers identified individually. No consumer settings are required. Left and right audio signals are also transmitted over lines PBLA and PBRA on the player bus 136 to external devices.

Address manipulator 106 is also coupled to a control bus 138, which is used to send and receive control signals to and from other processors in the system.

The system of FIG. 1 further includes an audio/video processor 140 which is coupled bi-directionally to both halves 118 and 120 of the D-bus, and coupled to receive data from the 32-bit wide S bus 122. Audio/video processor 140 is also coupled to the control bus 138, and is coupled to receive address bits A(15:2) from the system address bus 104. The audio/video processor 140 generally includes display path circuitry, an audio subsystem, timers, an interrupt controller, an expansion bus interface and a watchdog timer. The expansion bus interface couples to an expansion bus 142 which includes control lines 144 and an 8-bit bus 146 carrying multiplexed address and data information. The expansion bus 142 supports such devices as CD/CD-ROM player 148 and optional expansion bus RAM 150. The CD/CD-ROM player 148 is built into the housing of the system of FIG. 1 and provides the primary mechanism by which software is loaded into the system for execution on the CPU 102. It may also be used to play standard CD/audio disks as well as view standard photo-CD disks and handle other non-software formats.

The audio/video processor 140 communicates with audio/video output circuitry 152 via audio lines 157, control lines 156, and a 12- or 24-bit AD bus 158. The audio lines 157 and the AD bus 158 are uni-directional from the audio/video processor 140 to the audio/video encoder 152. The audio/video output circuitry 152, generally, generates the video timing and output video waveforms. It provides a composite video output, an RF output for connection to a standard television, an SVHS output, and separate left and right audio signal outputs. As previously mentioned, the audio outputs are included in the player bus 136.

The AD lines 158 carry pixel data in RGB format at the rate of 24 bits per pixel time. One pixel time is approximately 80 nS, the time required for the display scan to traverse one square pixel space in the NTSC standard. Thus the AD lines 158 can be multiplexed to actually provide half of a pixel color every 40 nS (25 MHz) using only 12 of the 24 AD signal lines. The audio output data on lines 157 is provided as a serial stream of digital data, at the standard CD-audio rate of one 16-bit left and right sample every 22.7 microseconds (44.1 kHz).

The system of FIG. 1 also includes a video input device 160 for "slipstream" capture of externally supplied video signals. The video input device 160 is coupled to the control bus 138 and provides a 32-bit output to the S-bus 122. The video input device 160 also provides synchronization signals to the audio/video output circuitry 152.

In addition to capturing video data, video input device 160 can also be used to capture software and other forms of data which are being downloaded over the external video input path. For example, the external video input may be connected to a cable TV network cable. At the request of the user of the system of FIG. 1, the cable TV head end equipment may download a game program over an otherwise unused cable channel. Video input device 160 would capture the software and burst it into system memory 108 in the same manner as captured video pixels are transmitted to system memory 108, except that this data can be transferred in an uncompressed 32-bit wide format. Instead of displaying the data, the system of FIG. 1 would execute it on the CPU 102. Alternatively, downloaded software may be received by a device on the expansion bus 142 and accessed by the system of FIG. 1 in a manner which is similar to the accessing of CD/CD-ROM player 148.

The system of FIG. 1 does not require a user to perform any system configuration process, although it does permit a user to set certain preferences to optimize the audio/video experience in a particular environment. Many variations can be made to the system of FIG. 1 without affecting its ability to perform the present invention.

B. Memory

All of the system address and timing signals are generated by the address manipulator 106. Any requests for access to system memory from either the CPU 102 or the audio/video processor 140 pass through the address manipulator 106.

Except for any allocation of protected system memory, and except for the physical VRAM depth limitation on data structures which are expected to be shifted out the S-port of a video RAM, the restrictions on where various portions of a software application may be located in system memory are minimal. In one embodiment, in a minimum system, with only one megabyte of system memory (VRAM), the low 64 k 32-bit words might contain CPU instructions and data. The next 300 k bytes might contain compressed image source data, and the next 172 k bytes might contain audio and other data. The next 150 k bytes might be allocated for one frame buffer (320 by 240 pixels by two bytes per pixel), and the last 150 k bytes might be allocated for a second frame buffer.

Frame buffers are arranged so that even numbered data lines reside in the left memory bank and odd numbered data lines reside in the right memory bank. Pixels are represented as 16-bit values divided as follows: five bits to represent a red pen number, five bits to represent a green pen number, four bits to represent a blue pen number, and two subposition bits H and V. In an alternative data format, either the H bit or the V bit may be replaced by a fifth blue pen number bit. When a pixel value is transmitted down the display path, a color look-up table translates each 4- or 5-bit pen number to an 8-bit value for the corresponding color DAC. The color look-up table can be updated prior to each scan line. Pixels are stored at a low resolution of 320 by 240 pixels by frame, and the H and V subposition bits indicate which quadrant of the low-resolution pixel area the designated color is actually considered to be located in.

Two vertically adjacent pixels are always fetched from the frame buffer over the S-bus to generate high-resolution pixels for display. The two pixels would be vertically adjacent if viewed directly on a display, but are horizontally adjacent as stored in the VRAM. That is, a single address provided to both banks of VRAM is sufficient to fetch both vertically adjacent pixels.

The two data lines which are fetched from the frame buffer contain the information required to calculate the pixel color value for the two high-resolution (640 by 480) scan lines that they surround (the lower high-resolution scan line of the upper low-resolution frame buffer data line, and the upper high-resolution scan line of the lower low-resolution frame buffer data line). Two horizontally adjacent sets of upper and lower frame buffer data are maintained in the video display path and an interpolation is performed to determine the actual pixel color for each desired high-resolution pixel to be displayed.

Alternatively, frame buffer data can be stored with full 480-line resolution. There are two forms of 480-line frame buffers. One form actually comprises two separate 240-line buffers, each representing the data for a particular field. In this case, the display operation is handled by disabling vertical interpolation and pointing the "current line video address" at the appropriate buffer when the image in that buffer is to be displayed. Note that the entire screen does not need to be in 480 mode. The second form has 480 lines sequentially in memory. The hardware is placed in a 480 mode and vertical interpolation is disabled. In this case, the video display path automatically retrieves alternate scan lines of frame buffer data in order to accommodate the interlaced display.

C. Expansion Bus

Expansion bus 142 is used to read data from the CD. Data can be read from the CD by Direct Memory Access (DMA) or via CPU memory access cycles. From the point of view of the CD, the difference may not necessarily be noticeable.

Expansion bus 142 consists of eight bi-directional data lines, three control lines, one strobe, one ready line and one interrupt line. The three control lines define the type of cycle the bus is performing. No bus events occur due to the state or edge of any control line, and only the activation of the strobe will cause a bus event.

Devices on the expansion bus 142 can assert an interrupt to the expansion bus interface to receive attention. The CPU 102 addresses devices on the expansion bus by reading or writing to predefined memory-mapped addresses. In particular, the CPU 102 first writes an expansion bus address as data to a predefined memory mapped address, then reads or writes desired data from or to a second predefined memory-mapped address.

Included in address manipulator 106 is an address generator whose operation will be described first with respect to CPU 102 memory access cycles. When the CPU interface receives a memory access cycle from CPU 102, it requests the D-bus from the D-bus arbiter. When granted, a CPU originated address is loaded into registers inside the address generator. The address generator receives addresses from the CPU via the CPU interface and also from a Spryte engine. The address generator also maintains a stack of DMA control information and can generate addresses for DMA transfers.

Other than CPU-originated addresses and spryte destination addresses, system memory accesses should be performed by DMA using a DMA stack in address manipulator 106.

The 128 22-bit registers in the DMA stack are organized in groups, each group storing the information required to control a respective DMA "channel."Each group is located at a respective fixed set of addresses in the DMA stack, and each channel is predefined to control transfers from a particular source device to a particular destination device. Two such groups include the expansion bus data. These two groups utilize four registers per group, allow looping and allow the channel to be programmed to interrupt the CPU 102 upon completion of a transfer. The DMA transfers are between system memory and the expansion bus. There are two channels available and the maximum DMA burst length is four words.

The expansion bus interface is a requester from within the audio/video processor 140. All requests for DMA transfers reach an arbiter in the address manipulator 106 over a single DMAREQ line. This request includes the desired channel number. When the arbiter grants control of the D-bus and address generator to the audio/video processor 140 requestor, it provides the DMA group address.

The system memory starting address is transmitted to the left and right bank address buses of system memory 108, respectively, in a manner similar to that for CPU-originated addresses and spryte destination addresses. For transfers from the expansion bus to system memory 108, the audio/video processor 140 drives the data from the appropriate expansion bus interface onto the D-bus 118, 120 and system memory 108 stores it at the selected address.

The length indication, which for expansion bus groups indicates the number of words to be transferred, passes through a source multiplexer to a register, and is decremented and written back to the same location in the grouping in DMA stack. Similarly to the writeback of the incremented starting address, the write address for the decremented length indication is provided.

If the length as decremented is positive, then the address generator causes the next data word to be transferred in the same manner as the first. Words are transferred in this manner until the maximum contiguous burst length is reached or the length indication as decremented is zero.

Some time prior to the completion of the data transfer, if desired, the CPU 102 may write a backup address and a backup length into the registers of the expansion bus group. Typically, this is done before the data transfer begins. When the value in the remaining length register becomes zero, the access is completed and a "loop test" is performed. According to the loop test, if the next starting address register is zero, the DMA transfer has completed. If the next starting address value is non-zero, then it is copied to the current address register for the group and the next starting length value is copied into the remaining length register. The appropriate read and write stack addresses are generated by the control circuitry. The address generator then continues the DMA transfer in the same manner as set forth above with respect to the original transfers specified for the group. This process repeats until the CPU 102 writes a zero into the next starting address register of the particular grouping.

The above description of a consumer interactive multimedia system is just one embodiment that can implement the present invention. It is contemplated that the present invention is designed to be used on a variety of interactive multi-media systems, computers or other video game platforms such as those available from Nintendo K.K., Sega Enterprises, Atari Corp. Commodore-Amiga, Sony and others. For example many video game platforms or computers would be capable of performing the present invention if they included at least some type of processor, a memory, and some type of I/O controller which may or may not be part of a processor. The I/O controller would be responsible for communication with storage devices (for example, CD-ROM, other disks, cable television, network, . . . ), a joy pad, or any other input device. A joy pad is typically a handheld unit which includes buttons, joy sticks, rollers, and other devices to allow the user to interact with a particular program.

II. Software Overview

Figure 2:
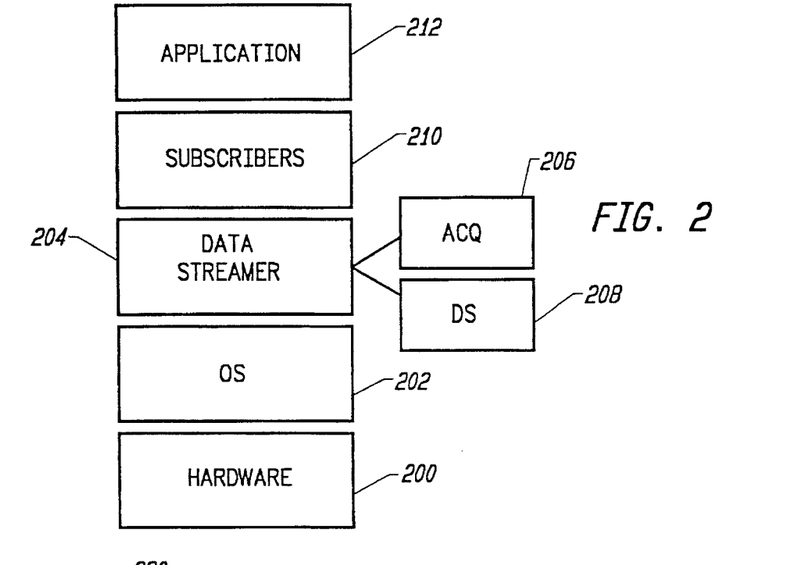
FIG. 2 is a conceptual diagram showing the interaction between the hardware and the layers of software.

FIG. 2 shows how the hardware and different layers of software interact with each other. At the base of the hierarchy is the hardware 200. Included with hardware 200 can be a read only memory (ROM), which can store resident firmware. The lowest level of software is the operating system 202. In various alternatives, the operating system can be found within a ROM or it can be loaded from a storage device.

Above operating system 202 is data streamer 204, which provides the means for accessing data from a CD or other storage device. Data streamer 204 includes at least two modules. Acquisition process 206 sequentially reads data from, for example, a CD at a given starting point and loads this data into a buffer. Streamer 208 will pick out various pieces of data from the buffer loaded by the acquisition module 206, join certain data together and send it to a subscriber. More information about the streaming software is described below.

Above the streaming software are the subscribers. The subscribers receive data directly from streamer 208. Subscribers are software modules that perform a certain function. For example, a subscriber can be a library of routines used to manipulate sound or video. The subscriber routines can be called by an application program 212. An example of application 212 would be a video game for a home interactive multi-media system.

For purposes of example only, the application 212 discussed in this application will be a maze game. Application 212 includes instructions for the hardware to perform the application with at least two types of data: memory resident data and streamed data. Memory resident data includes data that defines the 3-D environment. For example, cel arrays, maps, vertices, facets and events. A cel array is an array of video frames. A map is a layout map of a maze. Vertices are the corners of the walls. Facets are information that tie together which vertices represent which walls. Events are objects in the maze.

Streamed data is data coming from the CD as a linearly organized set of data and is used or discarded shortly after being read from the CD. Examples of streamed data include animations, videos, audio tracks. Standard videos or standard audio tracks can be stored as memory resident data. Data can be read from a CD-ROM to a processor on many channels. Based on the capabilities of the hardware, the processor can read many channels at one time, or the processor can choose between channels based on the actions of the user. For example, the memory resident data may include all the information to draw a room. The user can be having a conversation with a wizard in the room. Based on responses by the user, the processor can choose among three different channels. A first channel could include the audio/video of the wizard starting a fight with the user. A second channel could include audio/video of the wizard awarding a prize to the user. The third channel could include audio/video of the wizard offering advice to the user. Or, the different channels can show the wizard from different points of view; therefore, creating a 3-D effect while the user walks around the wizard.

III. Data Streaming

The overall data streaming process involves the distribution of chunks of data, which have been formatted into fixed sized blocks for efficiency purposes, to processes that consume specific types of data. For example, all audio data is sent to a process that handles only audio data. Application control of data flow at the stream level, as well as other streamer functionality, is accomplished by communicating with the data streamer 204 through messages. A library of routines that formats, sends, and synchronously awaits the completion of data streamer request messages simplifies formatting and sending messages for an application developer.

The subscriber processes consume the data delivered by the streamer 208. Typically, a subscriber process accepts and processes only one type of data, although a given subscriber process may subscribe to multiple data types. From the streamer's point of view, subscribers are the ultimate consumers of delivered data. In practice, this is true for only a couple of cases. The audio subscriber interacts directly with the audiofolio (OS Audio Management routines) to playback samples of audio data. A control subscriber performs certain actions, such as looping extreme (pausing and branching to other locations on the disc), when it receives certain chunks placed in a stream by a streams creator.

The operation in the data stream begins when empty buffers are delivered to the data acquisition process 206. These buffers are filled with data from some source (e.g. a storage device). The data buffers filled by the data acquisition process include many different types of data. Thus, one buffer may have, for example, film data, audio data, animation data. Streamer 208 parses each filled buffer and distributes the different types of the data to the different subscriber processes. Thus, audio data may be sent to a different subscriber than animation data. Once a subscriber is finished with a chunk of data, it returns the chunk to the data streamer 204. After all chunks in a buffer have been returned, the empty buffer is again sent to the acquisition process 206 to be filled. This procedure is repeated until the data acquisition process 206 indicates an end of file condition or is told to stop by an application message or control subscriber message. At any time in the procedure, the acquisition process 206 may be told to acquire data from a new position in a stream. This is largely transparent to the streamer process. The streaming process is designed to run asyncrhonously with respect to an application's main thread of execution. Subscribers are responsible for making sure that their actions are synchronized appropriately.

The effective data rate is determined by the CD transfer rate (approx. 300 Kb/sec) and the available bus bandwidth. The amount of DMA required by other operations can reduce the effective transfer rate to 200 Kb/sec. Multichannel streamed animations trade off frame rate, numbered channels, data size (which trades off cel dimensions and pixel size), and audio quality. For example, 22 kHz stereo translates into 44 Kb/sec, leaving approximately 160 Kb/sec available for video streams, assuming 200 Kb/sec as mentioned above. Eight channel streamed animation (allowing perspective view from eight directions) will leave approximately 20 Kb/sec per streamed animation. At a frame rate of 15 frames per second, this means each frame can only be 1.3K in size. This translates roughly into a 25×25 16-bit uncoded cel. 8-bit coding can double the size, but this is still only 50×25. Flat animations (non3D), requiring only one channel can be eight times as big, or 50×100 for a 16-bit uncoded cel, somewhat smaller for an anti-aliased animation.

The following table lists the data rate for various qualities of audio. These are 16-bit samples, compressed 2:1.

| | | |
|---|---|---|
| HIGH (44 kHz × 2) | 88 Kb/sec | Best Quality Audio |
| Stereo (22 kHz × 2) | 44 Kb/sec | Okay Quality Stereo |
| MONO (22 kHz × 1) | 22 Kb/sec | Okay Quality |
| LO (11 kHz × 1) | 11 Kb/sec | Minimal Quality Streaming Not Supported |
| NONE | 0 Kb/sec | Used When RAM Based Sounds Are Available |

Assuming 200 Kb/sec transfer rate, Best Quality Stereo allows for approximately 110 Kb/sec to allocate to video data. Okay Quality Stereo allows for 150 Kb/sec. This should be enough for most applications, although there can be up to 170 Kb/sec when stereo is not needed.

IV. Zones

In order to provide the illusion of continuity throughout the entire game, the environment (or maze) is divided into zones (environment zones). Similarly, the data used to generate the environment is divided into corresponding zones (data zones). Each data zone includes the data necessary to implement the corresponding environment zone. The data zones include memory resident data and streamed data. Ideally, the division of the environment into zones should make logical sense. For example, one or more rooms should fit within a zone. A room should not be divided into more than one zone. However, RAM constraints may affect the size of zones. Each zone is broken up into subzones. The subzones include a main subzone which is unique to that subzone, and various overlapping or transition subzones.

Figures 3, 4:
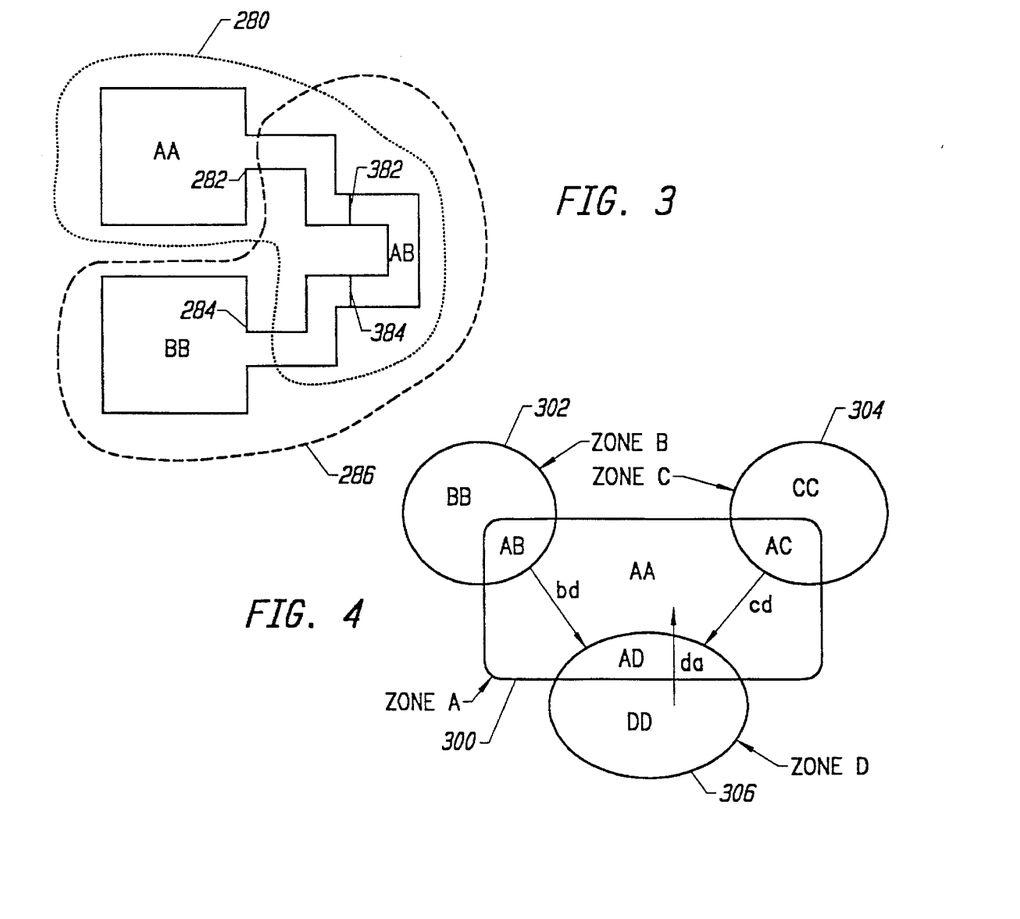
FIG. 3 is a bird's-eye view of part of a maze used in a game program.
FIG. 4 is a conceptual diagram showing four data zones and the overlapping subzones.

FIG. 3 represents a bird's eye view of a portion of an interactive environment which includes two rooms (AA, BB) and a hallway (AB). The portion of the environment shown in FIG. 3 is broken up into two overlapping zones: zone A and zone B. Zone A, which is shown by the dotted circle 280, includes room AA and hallway AB. Hallway AB extends from point 282 to point 284. Zone B, shown by dashed line 286, includes room BB and hallway AB. As can be seen, zone A and zone B both include hallway AB. Therefore, zone A and zone B are overlapping. Since hallway AB appears in both zone A and zone B, hallway AB is called an overlapping subzone or transition subzone. FIG. 3 shows only a portion of a maze. The entire maze would typically include many rooms and many zones.

As stated above, the audio/video program is divided into data zones which correspond to the environment zones shown in FIG. 3. FIG. 4 is an illustration of how data is broken up into zones. FIG. 4 shows four zones: A, B, C and D. Zones A and B correspond to zones A and B shown in FIG. 3. Zone A is shown in rectangle 300; zone B is shown in the circle 302; zone C is shown in circle 304; and zone D is shown in circle 306. As can be seen, the zones overlap. Each zone has a main subzone: AA, BB, CC and DD. Main subzone BB of FIG. 4 corresponds to room BB in FIG. 3. Main subzone AA of FIG. 4 corresponds to room AA of FIG. 3. Overlap or transition subzone AB corresponds to hallway AB in FIG. 3. FIG. 4 also shows overlap subzones AC and AD. If a zone has more than one overlap, no overlap is visible from within another overlap.

When a user moves along the path from room BB through hallway AB to room AA, a transition (or progression) from zone B to zone A occurs. While in room BB it is assumed that the data for zone B (data for subzones BB and AB) are resident in memory. Upon beginning the transition from zone B to zone A, the first data that is needed is data for subzone AA. The data for subzone AB is already in memory since the user is coming from zone BB. When in room BB and hallway AB, zones AC and AD are out of sight from the user. After storing data for AA, the next data needed to be stored in memory is either AC or AD depending on which way the user goes. Data for subzone AB should also be stored in case the user decides to go back to room BB. All three subzones, AB, AC and AD have equal probability of being needed. Thus, loading AC and AD in any order will do. One requirement as to speed is that the last overlap zone (either AD or AC) must be available before the user can cross the AA room so that subzones AD or AC are visible.

Figures 5, 6:
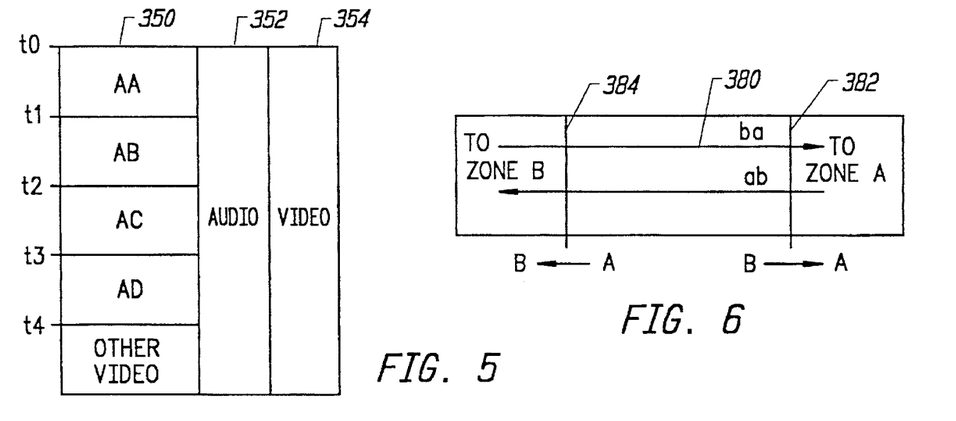
FIG. 5 shows an example of a data stream.
FIG. 6 shows a portion of an overlapping subzone with two trigger lines which are used to provide a hysteresis effect.

FIG. 5 is a conceptual representation of a stream of data read from a CD in accord with the above-described transition from zone B to zone A. Depicted are at least three channels of the data: memory resident data 350, transitory audio data 352 and transitory video data 354. Memory resident data 350 includes data for subzones AA, AB, AC, AD and other necessary video data.

The current invention allows for backtracking to previous levels. To handle backtracking, the overlap subzones have trigger lines on both ends of the overlap subzone with some wandering space between the two trigger lines. The gap gives a hysteresis effect, so that the user cannot simply sit on one point and make the program thrash by stepping back and forth.

FIG. 6 illustrates the hysteresis feature. If the user takes path ba (arrow 380) from zone B to zone A, stream A is triggered by crossing the B to A trigger line 382. If the user turns back, the loading of data for zone B is not triggered until the A to B trigger line 384 is crossed. The trigger lines should be placed so that the user cannot move out of the overlap subzone and into the main subzone before the data for the main subzone is loaded. Since the main subzone data is always loaded first, the area between the trigger line and the main subzone does not have to be large. However, as with overlap areas, the main subzone should not be visible from the trigger line, and should not be visible from the transition subzone until the main area's zone data can be loaded. This concept can be further illustrated by looking at FIG. 3. When the user traverses from room BB to room AA, the loading of the zone of data for room AA is triggered by the crossing of trigger line 382. When the user is traversing from room AA to room BB, the zone data for zone B is loaded at the crossing of line 384.

When designing the subzones, it is useful to design a topography such that the user will not reach the next main zone before the data is loaded. Various strategies have been contemplated for dealing with the case when the data does not make it in time. For example, stretching the dimensions of the current visible area of the environment indefinitely until the data arrives, or simply prevent movement any closer to the given area. It may also prove useful to provide global texture data which is always in memory and can be used in the vicinity of transitions. That is, if the user is about to reach a zone before the data is there, keep altering the dimensions of the hallway so it appears that the user is not reaching the end of the hallway. However, every attempt should be made to design subzones to eliminate this situation or at least make it unlikely. The goal is to have seamless transitions through all subzones; therefore, eliminating the need for levels into which ordinary games are divided and providing instead a complete beginning to end experience.

V. Storage of Data

Figure 7:
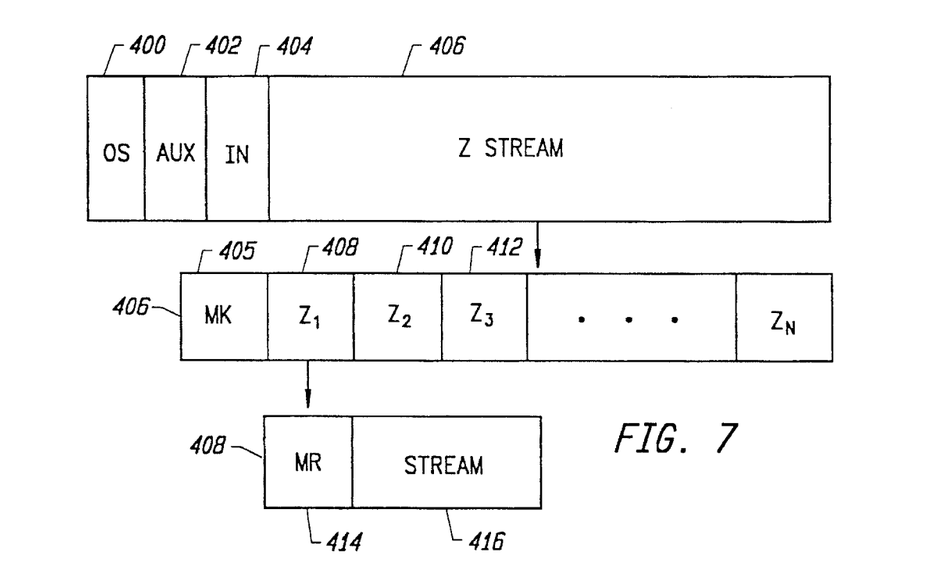
FIG. 7 illustrates how data is stored on a CD-ROM for the present invention.

FIG. 7 depicts a linear representation of how data is stored on a CD. The same format can be adapted to be used for transmission of data over a cable system, or storage on any other type of storage medium. The first location OS 400 stores operating system code. This code is specific to the interactive multi-media system. Auxiliary files 402 include fonts, DSP instruments (code which runs the digital signal processor) and other setup information. IN 404 includes the software instructions (code) which program the hardware to present the audio/video program. IN 404 may also include streaming libraries and subscriber code. Z-stream 406 is the zone data, which is divided into the zones (e.g. $Z_1$ 408, $Z_2$ 410, $Z_3$ 412 . . . ). Each zone includes at least two components. The first component, MR 414, includes the memory resident data. The second component, stream 416, includes the stream data; for example, transitory audio and video data. MK 405 is a table of disc offsets for each zone. Thus, when the disk drive attempts to read the data for zone $Z_3$, it first checks where on the disc zone $Z_3$ is by reading MK 405.

A typical CD is approximately 650 MB. OS 400 and auxiliary files 402, occupy approximately 726 KB. IN 404 occupies approximately 240 KB. Z-stream 406 occupies approximately 645 MB. Each data zone is approximately 10 MB. Of the 10 MB, 1 to 1½ MB are typically memory resident data and 8½ to 9 MB are typically the streamed audio or video. The memory resident data is divided into 32K partitions which is the size recognized by the acquisition process 206 (shown in FIG. 2).

Figure 8:
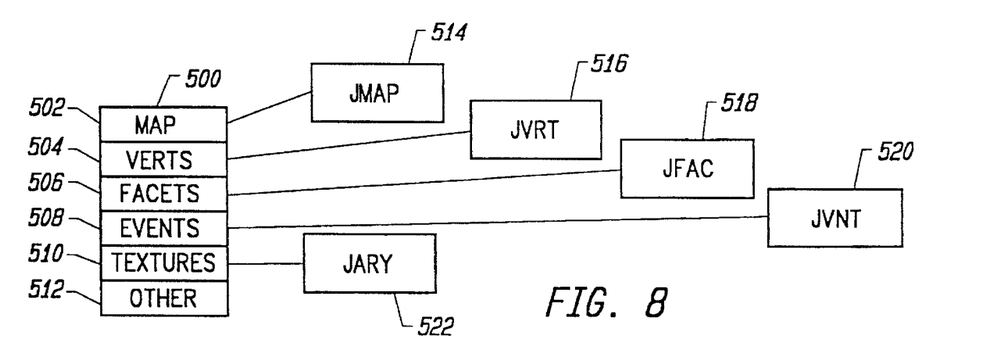
FIG. 8 depicts a subzone table.

As described above, when a user is interacting with a particular zone, all of the subzones of data for that zone are loaded into the system memory. In addition to that data, the system memory also includes a series of subzone tables. There is one subzone table for every subzone on the CD. FIG. 8 depicts an example of the subzone table 500, which includes six pointers: MAP 502, VERTS 504, FACETS 506, EVENTS 508, TEXTURES 510 and OTHER DATA 512. Each of these pointers point to a location in the system memory where that particular data for that particular subzone is located. For example, MAP pointer 502 points to map type data 514 (JMAP). The VERTS pointer 504 points to the vert type data 516 (JVRT). FACETS pointer 506 points to the facets type data 518 (JFAC). The EVENTS pointer 508 points to the event type of data 520 (JVNT). The TEXTURES pointer 510 points to the textures type of data 222 (JARY). As data is loaded into the system memory, the particular subzone table is loaded with the proper pointer and a flag is set indicating that that particular subzone table is pointing to valid data.

VI. Operation

Figure 9:
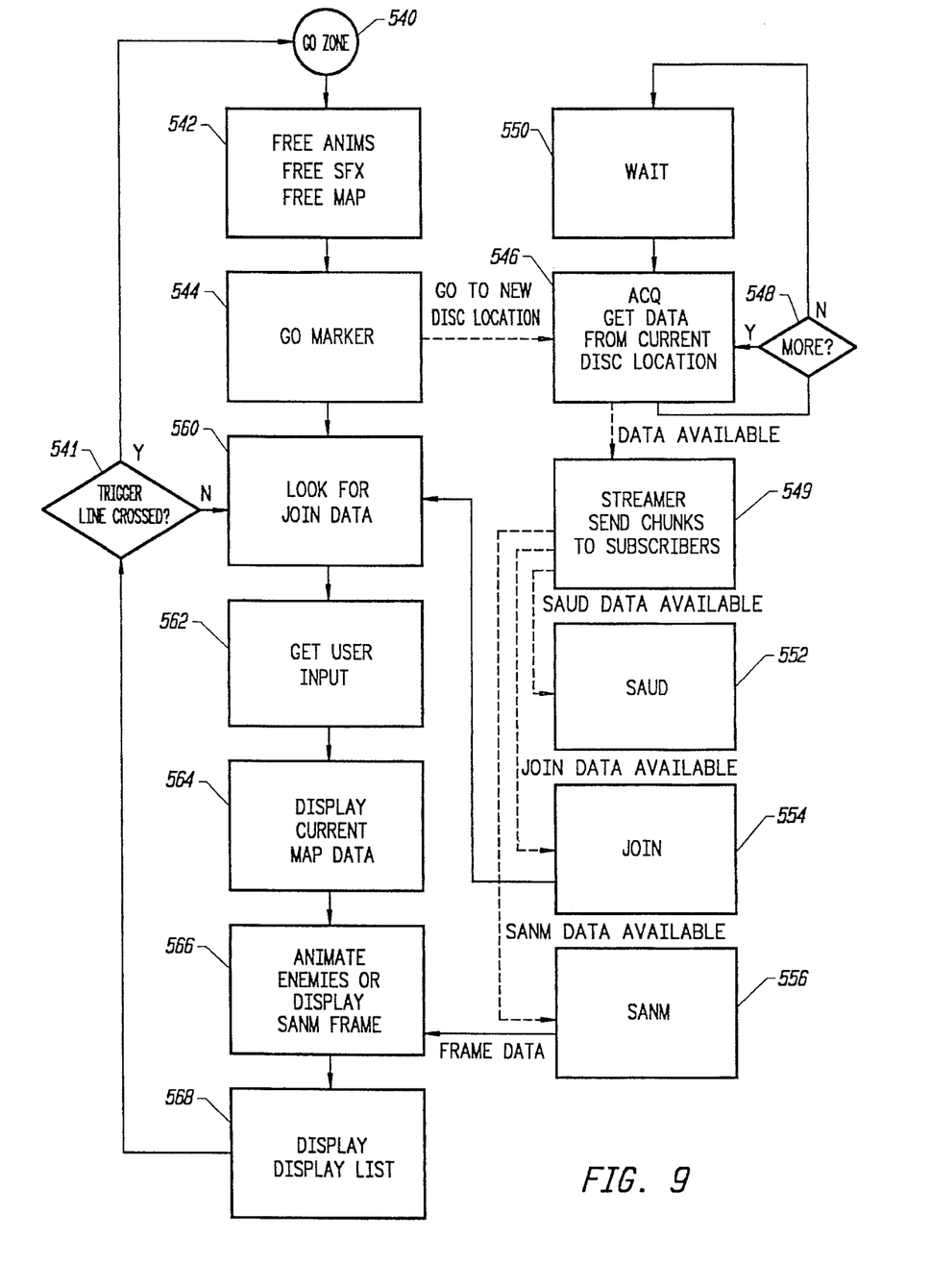
FIG. 9 is a flow chart illustrating how an interactive multi-media system, utilizing the present invention, presents an audio/video program.

FIG. 9 is a flow chart which explains how data zones are used and how data is presented during the operation of a multi-media system. When a user crosses a trigger line the system enters a Go_Zone state 540 which signifies that there will be a transition between zones. The next step, Free Anims, SFX, Map 542 deallocates the system memory. That is, the data in memory used for the current zone is freed up in order to load new data in. The exception to this rule is that the data for the current subzone is still maintained in memory. The system sends the signal GO_MARKER 544 which indicates the next zone to be loaded from the CD. The GO_MARKER signal is sent to the acquisition process 206 described in FIG. 2. When the acquisition process 206 receives a GO_MARKER, the acquisition process reads data from the location pointed to by the GO_MARKER address (step 546). Acquisition process 206 puts the data into a buffer for streamer 208. Subsequently, the acquisition process 206 determines whether there is more data in that zone to be read (step 548). If so, acquisition process 206 continues to loop through the read process putting data into a data buffer. When there is no more data in that zone, acquisition process 206 goes into a wait state 550. After data has been read into the data buffer, acquisition process 206 sends DATA_AVAILABLE to streamer 208, which sends data from the data buffer to various subscribers in step 549.

The subscribers could include SAUD, JOIN, and SANM. In steps 552, the SAUD subscriber will process streamed audio data and send it to the DSP. More specifically, the SAUD subscriber points the DSP to a buffer. At step 554, the JOIN subscriber collects chunks of JOIN type data, which is basically memory resident data, and assembles pieces of data into pages of data and performs any processing of the data that is necessary. In step 556, the SANM subscriber receives animation data and prepares it for display. This usually includes one frame of video data.

After the system sends a GOMARKER, the system then looks for JOIN data 560. As described above, the JOIN subscriber collects chunks of JOIN data. Once the system receives the JOIN data, the system looks for any user input 562. User input could include manipulation of any of input devices on the joypad. The system then displays current map data to the user. At step 566, any enemies or animations provided by SANM (step 556) are assembled and put into a display list. Finally, the display list is displayed (step 568) and the system determines whether a trigger line has been crossed 541. If a trigger line has been crossed, the system goes back to GO_ZONE 540. Otherwise, the system continues to loop through steps 560–568.

Figure 10:
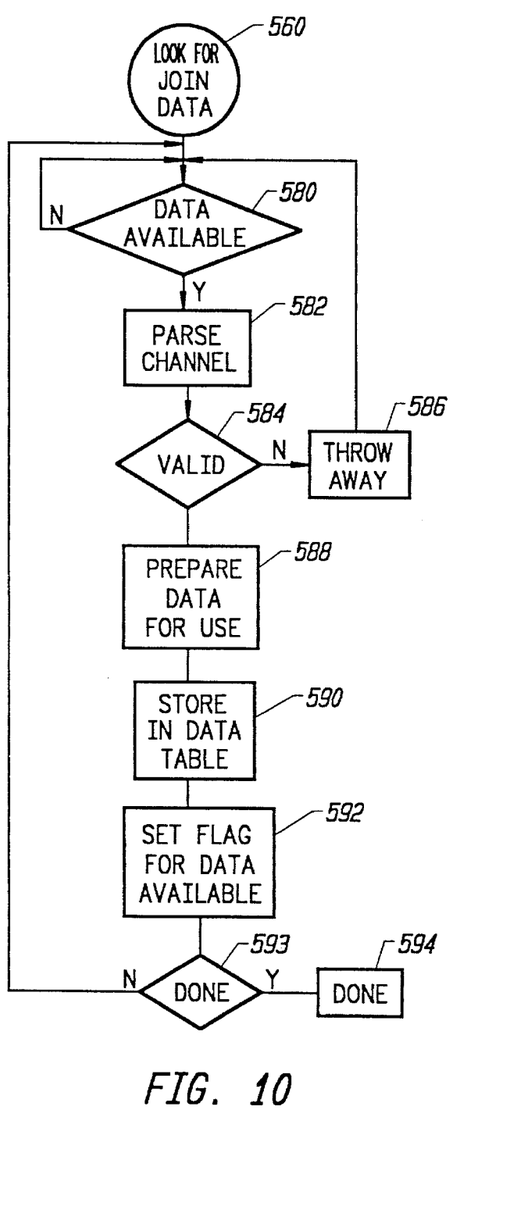
FIG. 10 is a flow chart which explains in greater detail the LOOK FOR JOIN DATA process of FIG. 9.

FIG. 10 is a more detailed description of Look For JOIN Data 560. There are eight types of JOIN data. Thus, steps 580–592 are performed eight times per frame, once per data type. The eight JOIN types are: JANM, animation data; JSND, RAM special effects data; JMAP, map data; JVRT, vert data; JFAC, facets data; JVNT, events data; JARY, textures data; and JCEL, cel data. The first step is to decide whether data is available 580. If data is available, parse the channel being used to transmit the data 582. By parsing the channel, the system will read all the channel identification information. This information encodes various attributes of the data on the channel. For example, the information describes whether the data is subzone data, enemy data or object data. The channel information also identifies which one of the many enemies in the environment or which one of the many objects the data belongs to. The channel information also encodes what part of the enemy, object or subzone information is being transferred. After parsing the channel, a determination is made as to whether the data is valid 584. If it is not valid, the data is thrown out 586. If it is valid, the data is prepared for use 588. This can mean updating pointers in memory to the various video cels of data. The data is then stored in a data table 590 and a flag is set to indicate that the data is available 592. The process then determines (593) whether the loop (580–592) has been performed for all eight types of JOIN data. If so, then done 594. Otherwise, go back to step 580 and repeat the loop for the next type of JOIN data.

Figure 11:
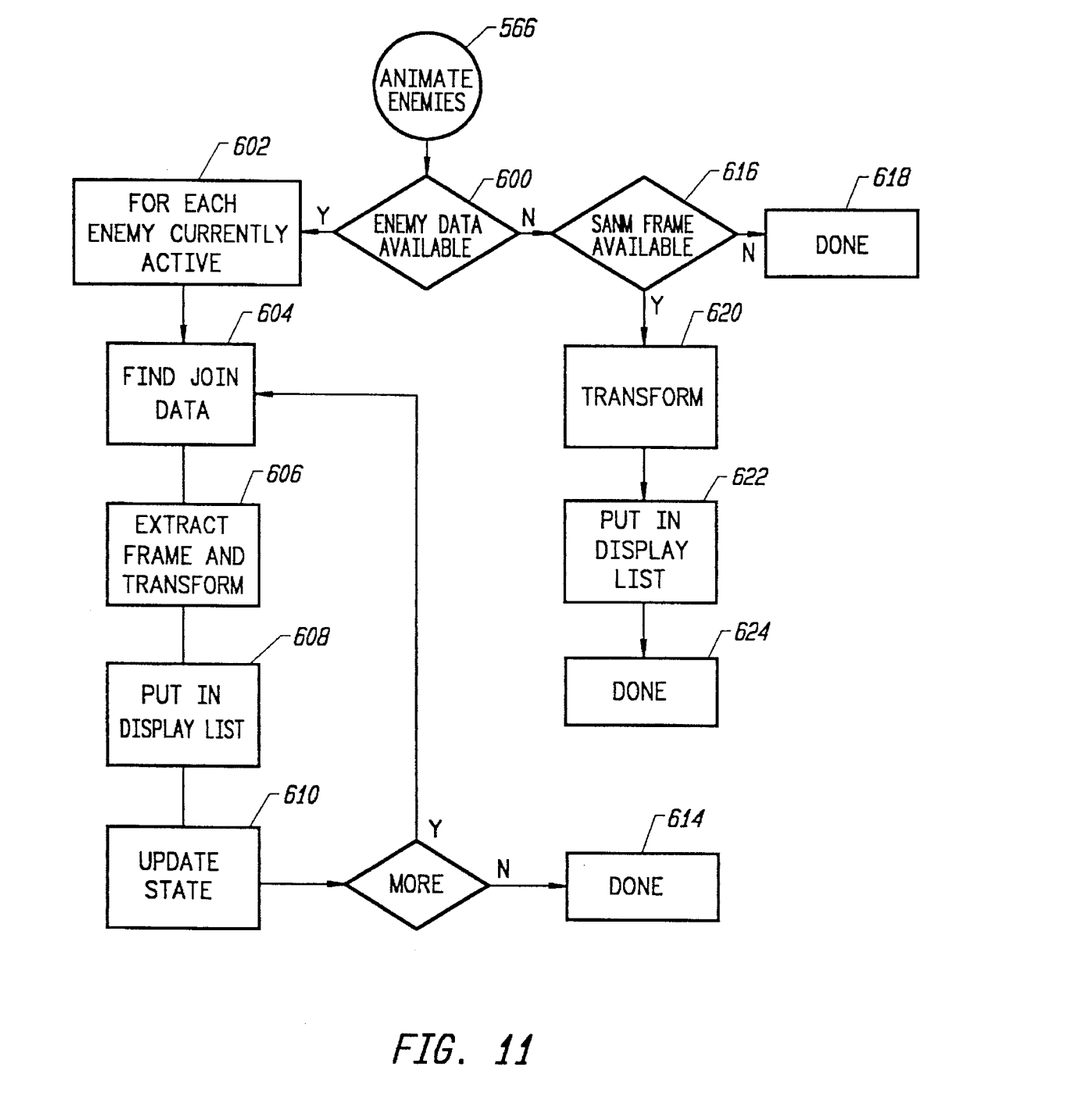
FIG. 11 is a flow chart which explains in greater detail the ANIMATE ENEMIES process of FIG. 9.

FIG. 11 shows a more detailed description of ANIMATE ENEMIES OR DISPLAY SANM FRAME 566. Animation data is brought from the disk frame by frame. The first step 600 is to determine whether enemy data is available. If it is available, for each enemy currently active 602 a loop of step 604–610 is performed. First, the Join_Data for the appropriate animation is found 604. The frame data is extracted and transformed for display in step 606. The data is put in display list 608, and then the state of the enemy is updated 610. The system stores the current state of every enemy; for example, whether the enemy is dead, alive, wounded, etc. Thus, whenever the enemy appears, the enemy will appear in that state. For example, it may be important that once an enemy is killed, that enemy remains dead for the remainder of the game, unless the enemy has more than one life.

If there is no enemy data available in step 610, a determination is made as to whether there are any animation frames available 616. If not, done 618. If there is animation available, the animation is transformed for display 620 and put on a display list 622.

Figure 12:
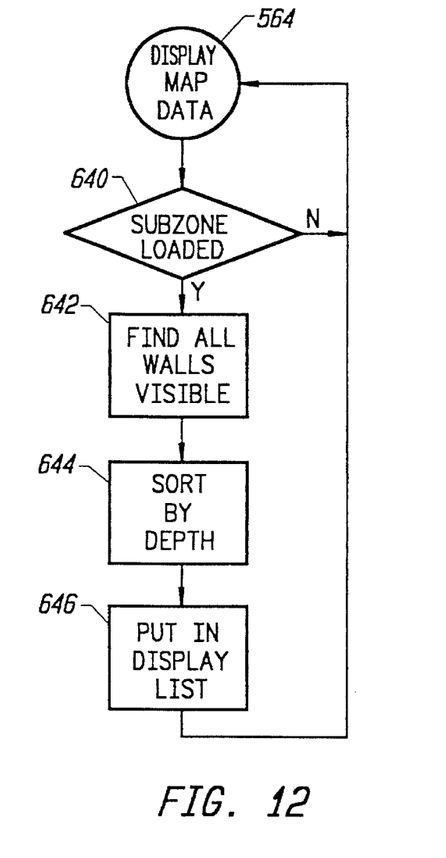
FIG. 12 is a flow chart which explains in greater detail the DISPLAY MAP DATA process of FIG. 9.

FIG. 12 explains the Display Map Data process 564. Steps 640–646 are performed for each subzone in the current zone. First, a determination is made whether the subzone is loaded 640. A subzone is considered loaded if all the flags in the subzone table for that subzone are set in look for JOIN data 560. If the subzone is loaded, the system finds all walls that are visible given the current position 642. The walls are sorted by depth 644. For example, the walls closest to the user are placed first on the list of walls. The walls are then put into the display list 646.

The foregoing description of a preferred embodiment of the invention has been presented for purposes of illustration and description. It is not intended to be exhaustive or to limit the invention to the precise form disclosed, and obviously many modifications and variations are possible in light of the above teaching. The disclosed embodiment was chosen and described in order to best explain the principles of the invention and its practical application to thereby enable others skilled in the art to best utilize the invention in various embodiments and with various modifications as are suited to a particular use contemplated. It is intended that the scope of the invention be defined by the claims appended hereto.

What is claimed is:

1. A method for using data during an video presentation, said presentation including an environment divided into zones, the method comprising the steps of:

storing in a storage device first data for a first zone;

presenting at least a first portion of said first data while a user interacts with a first zone, said first zone including a transition subzone;

presenting at least a second portion of said first data, while said user interacts with said transition subzone;

loading into said storage device second data for a second zone while said user interacts with said transition subzone, said second zone includes said transition subzone, said second data replacing at least a subset of said first data, said subset of said first data not including said second portion of said first data; and presenting at least a first portion of said second data while said user interacts with said second zone.

2. A method according to claim 1, wherein:

said first portion of said first data and said second portion of said first data are mutually exclusive.

3. A method according to claim 1, wherein:

said first transition subzone includes a first trigger line and a second trigger line.

4. A method according to claim 1, further including the step of:

loading into said storage device said first data.

5. A method according to claim 4, wherein:

said first transition subzone includes a first trigger line and a second trigger line;

said step of loading said first data occurs when said user crosses said first trigger line after crossing said second trigger line; and said step of loading said second data occurs when said user crosses said second trigger line after crossing said first trigger line.

6. A method according to claim 1, wherein:

said step of presenting at least a second portion of said first data appears to be continuous.

7. A method according to claim 1, wherein:

said second zone does not include said first zone except for said transition subzone.

8. A method according to claim 1, wherein:

said first zone further includes a first subzone and a second subzone in addition to said transition subzone; and said step of loading into said storage device second data replaces data for said first subzone before replacing data for said second subzone.

9. A method according to claim 1, further including the steps of:

presenting at least said second portion of said first data while said user interacts with said transition subzone after said step of presenting at least a first portion of said second data;

loading into said storage device said first data for said first zone while said user interacts with said transition subzone, said first data replacing at least a subset of said second data, said subset of said second data not including said second portion of said first data; and presenting said first portion of said first data while said user interacts with said first zone.

10. A method for using data during an video presentation, said presentation including an environment divided into zones, the method comprising the steps of:

storing in a storage device first data for a first zone, said first zone including a main subzone, a first transition subzone and a second transition subzone;

presenting at least a first portion of said first data while a user interacts with said main subzone;

providing said user an opportunity to move to said first transition subzone and said second transition subzone;

presenting at least a second portion of said first data while said user interacts with said first transition subzone if said user moves to said first transition subzone;

presenting at least a third portion of said first data while said user interacts with said second transition subzone if said user moves to said second transition subzone;

loading into said storage device second data for a second zone while said user interacts with said first transition subzone if said user moved to said second transition subzone, said second zone includes said first transition subzone, said second data replacing said first portion of said first data;

presenting at least a third portion of said first data while said user interacts with said second transition subzone if said user moved to said second transition subzone;

loading into said storage device third data for a third zone while said user interacts with said second transition subzone if said user moved to said second transition subzone, said third zone includes said second transition subzone, said third data replacing said first portion of said first data; and presenting said second data if said second data is loaded into said storage device and presenting said third data if said third data is loaded into said storage device.

11. A processor readable storage medium having processor readable program code embodied on said processor readable storage medium, said processor readable program cede for using data during an video presentation, said processor readable program code including:

first program code, said first program code stores in a storage device first data for a first zone;

second program code, said second program code presents at least a first portion of said first data while a user interacts with a first zone, said first zone including a transition subzone;

third program code, said third program code presents at least a second portion of said first data while said user interacts with said transition subzone;

fourth program cede, said fourth program code loads into said storage device second data for a second zone while said user interacts with said transition subzone, said second zone includes said transition subzone, said second data replacing at least a subset of said first data, said subset of said first data not including said second portion of said first data; and fifth program code, said fifth program code presents at least a first portion of said second data while said user interacts with said second zone.

12. A processor readable storage medium according to claim 11, wherein:

said rest transition subzone includes a first trigger line and a second trigger line.

13. A processor readable storage medium according to claim 11, wherein:

said first transition subzone includes a first trigger line and a second trigger line; and said fourth program code loads said second data when said user crosses said second trigger line after crossing said first trigger line.

14. A processor readable storage medium according to claim 11, wherein:

said third program codes present said second portion of said first data in a continuous manner.

15. An apparatus for presenting data during an video presentation on a video presentation apparatus, said presentation including an environment divided into zones, comprising:

means for storing in a storage device first data for a first zone;

means for presenting at least a first portion of said first data while a user interacts with a first zone, said first zone including a transition subzone;

means for presenting at least a second portion of said first data while said user interacts with said transition subzone;

means for loading into said storage device second data for a second zone while said user interacts with said transition subzone, said second zone includes said transition subzone, said second data replacing at least a subset of said first data, said subset of said first data not including said second portion of said first data; and means for presenting at least a first portion of said second data while said user interacts with said second zone.

16. A method for creating a video presentation to be used on an interactive multi-media system, comprising the steps of:

defining an interactive environment;

dividing said environment into zones so that memory resident data necessary to implement each zone is capable of being stored in a memory of the interactive multi-media system;

dividing said zones into subzones, a subset of said subzones being overlap subzones so that each zone has at least one overlap subzone in common with another zone;

creating said data for each subzone;

including a first trigger line in each overlap subzone that triggers a transition from one zone to a second zone when a viewer is progressing from said one zone to said second zone.

17. A method according to claim 16, further including the step of:

storing instructions and data necessary to implement each zone on a compact disc.

18. A processor readable storage medium having processor readable program code embodied on said processor readable storage medium, said processor readable program code for using data during an video presentation, said processor readable program code including:

first program code, said first program code stores in a storage device first data for a first zone, said first zone including a main subzone and a first transition subzone;

second program code, said second program code presents at least a first portion of said first data if a user interacts with said main subzone, presents at least a second portion of said first data if said user interacts with said first transition subzone and presents at least a first portion of second data if said user interacts with a second zone; and third program code, said third program code loads into said storage device second data for said second zone while said user interacts with said first transition subzone, said second zone includes said first transition subzone, said second data replacing at least a first subset of said first data, said first subset of said first data not including said second portion of said first data.

19. A processor readable storage medium according to claim 18, wherein:

said first zone further includes a second transition subzone;

said second program code presents at least a third portion of said first data if said user interacts with said second transition subzone and presents at least a first portion of third data if said user interacts with a third zone; and said third program code loads into said storage device third data for said third zone while said user interacts with said second transition subzone, said third zone includes said second transition subzone, said third data replacing at least a second subset of said first data, said second subset of said first data not including said third portion of said first data.

20. A processor readable storage medium according to claim 19, wherein:

said first transition subzone includes a first trigger line and a second trigger line; and said second transition subzone includes a third trigger line and a fourth trigger line.

21. A processor readable storage medium according to claim 18, wherein:

said second program code presents data continuously during said video presentation.

22. An apparatus for presenting data during an video presentation, said presentation including an environment divided into zones, comprising:

a processor;

a memory in communication with said processor;

an input device, in communication with said processor;

an output device, in communication with said memory; and a storage peripheral in communication with said memory, said storage peripheral storing a plurality of sets of data, each set of data corresponding to one of said zones, said memory capable of storing at least one set of data but not all of said plurality of sets of data simultaneously;

wherein:

said memory storing a first set data for a first zone while a user interacts with said first zone;

said processor, in conjunction with said memory, said input device and said output device, presents at least a first portion of said first data while a user interacts with said first zone, said first zone including a transition subzone, said processor presents at least a second portion of said first data while said user interacts with said transition subzone;

second data for a second zone is loaded into said memory while said user interacts with said first transition subzone, said second zone includes said transition subzone, said second data replacing at least a subset of said first data, said subset of said first data not including said second portion of said first data; and after said second data is loaded, said processor, in conjunction with said memory, said input device and said output device, present at least a first portion of said second data while said user interacts with said second zone.

* * * * *

UNITED STATES PATENT AND TRADEMARK OFFICE
CERTIFICATE OF CORRECTION

PATENT NO. : 5,577,180
DATED : November 19, 1996
INVENTOR(S) : Lawrence Paul Reed It is certified that error appears in the above-indentified patent and that said Letters Patent is hereby corrected as shown below:

Item [54],

Title Page: delete "ZONE DATA STREAMING FOR 3-DIMENSIONAL VIDEO ENVIRONMENT" and substitute therefor --SYSTEM AND METHOD FOR ORGANIZING AND USING DATA FOR A 3-DIMENSIONAL VIDEO ENVIRONMENT--.

Col. 1, lines 1-2: delete "ZONE DATA STREAMING FOR 3-DIMENSIONAL VIDEO ENVIRONMENT" and substitute therefor --SYSTEM AND METHOD FOR ORGANIZING AND USING DATA FOR A 3-DIMENSIONAL VIDEO ENVIRONMENT--.

Col. 4, line 67: after "program." insert --Fig. 3 shows two zones and the overlapping subzone.--.

Col. 13, line 29: after "data for" and before "AA," insert --subzone--.

Col. 13, line 29: after "next data" delete "needed to be".

Col. 18, line 22: delete "cede" and substitute therefor --code--.

Col. 18, line 33: delete "cede," and substitute therefor --code,--.

UNITED STATES PATENT AND TRADEMARK OFFICE
CERTIFICATE OF CORRECTION

PATENT NO. : 5,577,180
DATED : November 19, 1996
INVENTOR(S) : Lawrence Paul Reed It is certified that error appears in the above-indentified patent and that said Letters Patent is hereby corrected as shown below:

Col. 18, line 45: after "said" and before "transition" delete "rest" and substitute therefor --first--.

Signed and Sealed this

Eleventh Day of March, 1997

Attest:

BRUCE LEHMAN

Attesting Officer

Commissioner of Patents and Trademarks